United States Patent [19]

Fukumura et al.

[11] 4,456,704

[45] Jun. 26, 1984

[54] PRODUCTION OF FOAM

[75] Inventors: Mikio Fukumura; Hideo Shibata, both of Nara; Shuhei Doi, Yokkaichi; Tsutomu Isaka, Yokkaichi; Takayuki Inoue, Yokkaichi, all of Japan

[73] Assignee: Sekisui Kaseihin Kogyo Kabushiki Kaisha, Nara, Japan

[21] Appl. No.: 433,383

[22] Filed: Oct. 8, 1982

[30] Foreign Application Priority Data

Oct. 8, 1981 [JP] Japan ............................. 56-160720

[51] Int. Cl.³ ........................... C08J 9/06; C08J 9/14
[52] U.S. Cl. ...................................... 521/79; 264/53; 264/54; 521/82; 521/88; 521/94; 521/143; 521/154
[58] Field of Search ................... 521/143, 154, 82, 79, 521/88, 94

[56] References Cited

U.S. PATENT DOCUMENTS

| | | | |
|---|---|---|---|
| 4,160,072 | 7/1979 | Shinkai et al. | 521/143 |
| 4,252,906 | 2/1981 | Hosokawa et al. | 521/143 |
| 4,333,898 | 6/1982 | Schmidtchen | 521/143 |

Primary Examiner—Morton Foelak
Attorney, Agent, or Firm—Armstrong, Nikaido, Marmelstein & Kubovcik

[57] ABSTRACT

A method for producing cross-linked polyethylene resin foams which comprises mixing a polyolefin resin, a blowing agent and, optionally, a surface active agent containing hydroxyl groups or an acid amide compound under pressure, said polyolefin resin containing a cross-linkable ethylene polymer having on the side chains thereof silyl groups which effect cross-linking upon contact with water; extruding the mixture into a low pressure zone where the extrudate is allowed to expand; and bringing the expanded extrudate into contact with a silanol condensing catalyst so that the expanded extrudate is cross-linked on contact with water.

18 Claims, 2 Drawing Figures

PRODUCTION OF FOAM

BACKGROUND OF THE INVENTION

1. Field of the Invention

The present invention relates to a process for producing a crosslinked polyethylene resin foam. More particularly, it relates to the production of crosslinked polyethylene resin foam in which the crosslinking is accomplished through contacting the hydrolyzable silyl groups on the side chains of the polyethylene resin, which is a constituent of the foam, with water.

2. Description of the Prior Art

There have been disclosed many kinds of techniques of producing crosslinked polyethylene foams. According to one of them, a mixture of polyethylene regin and blowing agent is irradiated with ionizing radiation so that the crosslinking reaction takes place, and then the mixture is heated under normal pressure so that the expansion takes place. According to another typical technique, a mixture of polyethylene resin, organic peroxide, and thermal decomposition type blowing agent is heated at a temperature lower than the decomposition point of the blowing agent and higher than the decomposition point of the organic peroxide so that the crosslinking reaction takes place, and then the mixture is heated under normal pressure at a temperature higher than the decomposition point of the blowing agent so that the expansion takes place.

These known techniques are being employed for the commercial production of crosslinked polyethylene resin foams, but they are not necessarily satisfactory and have still some disadvantages to be overcome. That is to say, the method involving radiation is disadvantageous in that a special expensive apparatus is required and radiation does not reach deep inside the thick sheets and other thick-walled moldings, with the result that uniform crosslinking is not performed. The method for crosslinking with a peroxide has also a disadvantage that the crosslinking reaction tends to take place prematurely when a polyethylene resin is incorporated with a peroxide with heating and kneading, with the result that it is difficult to produce foamed sheets of uniform thickness.

In addition to the crosslinking methods employing radiations or organic peroxides, there is another known method. According to this method, the polyethylene resin constituting the foam is made crosslinkable by the introduction of hydrolyzable silyl side chains and the crosslinking is accomplished through the hydrolysis of the silyl groups. In other words, a polyethylene resin is copolymerized with an ethylenic unsaturated silane compound by random copolymerization or graft copolymerization. The copolymerized polyethylene resin is then mixed with a mixture of thermal decomposition type blowing agent and crosslinking catalyst. The resulting resin composition is formed into a sheet and other molding. The moldings are brought into contact with water to bring about the crosslinking reaction. Thereafter, to accomplish expansion, the moldings are heated under normal pressure above the decomposition point of the blowing agent used.

This method, however, is also as unsatisfactory as the above-mentioned methods, because the step for preparing expandable moldings (e.g., sheet) and the step for expansion are performed separately and the crosslinking cannot be carried out at a sufficiently high temperature.

A problem commonly encountered in the above-mentioned conventional methods is that the resulting foamed product tends to shrink a great extent when exposed to high temperatures for a long time. This is caused by the so-called memory effect which is experienced when expansion is performed after crosslinking.

There is known a method for producing foams (such as an expanded sheet) by performing molding and expansion in one step. According to this method, a thermoplastic resin is mixed with a blowing agent and the resulting mixture is extruded into a low pressure zone where the extrudate is allowed to expand, and the thus prepared foam is crosslinked by the above-mentioned means. This method does not involve the problem of memory effect.

This method, however, suffers from a disadvantage. In actual production, a polyethylene resin having silyl groups, a blowing agent, and a silanol condensing catalyst are mixed in an extruder and the extrudate is allowed to expand upon emergence from the extruder. The expanded extrudate is subsequently brought into contact with water in order to bring about crosslinking. Since contact and absorption of water take a long time, crosslinking also takes a very long time. An attempt to reduce the crosslinking time by introducing water into the extruder have been unsuccessful because crosslinking takes place in the extruder or extrusion die and the crosslinked resin undergoes a high shear which breaks molecules mechanically and generates heat. Introduction of water is undesirable particularly where products having a high degree of crosslinking or a high degree of expansion are to be obtained. This undesirable result is experienced even when water is not introduced intentionally into the extruder. Namely, the water unavoidably enters into the extruder, such as by adhering to the resin, which results in producing the crosslinking reaction, whereby stable extrusion can never be achieved. Also, moisture on the resin pellets could prevent the production of foams of uniform quality.

Furthermore, the above-mentioned method has another disadvantage that the extruded foam tends to shrink and does not recover easily upon ageing in the heated air. Moisture in the air causes additional crosslinking to take place during ageing, with an adverse effect on the recovery by ageing. Incomplete recovery leads to an insufficient degree of expansion. Presumably, this is because crosslinking causes the cell walls of the foam to decrease in gas permeability or the shape of the cell walls to be fixed.

In order to overcome the above-mentioned disadvantages, the present inventors completed this invention.

SUMMARY OF THE INVENTION

It is an object of the present invention to provide a method for producing crosslinked polyethylene resin foams which comprises mixing a polyolefin resin and a blowing agent under pressure, said polyolefin resin containing a cross-linkable ethylene polymer having on the side chains thereof silyl groups which effect crosslinking on contact with water, extruding the mixture into a low pressure zone where the extrudate is allowed to expand, and bringing the expanded extrudate into contact with a silanol condensing catalyst so that the expanded extrudate is crosslinked on exposure to moist air.

It is another object of this invention to provide a method for producing crosslinked polyethylene resin foams as mentioned above wherein said polyolefin resin is mixed with a blowing agent and a surface active agent containing hydroxyl groups or an acid amide compound.

According to the method of this invention, (1) foams of uniform quality can be produced; (2) the crosslinking rate and crosslinking efficiency can be improved; and (3) crosslinking can be accomplished after the foam has completely recovered its original dimensions because the term of crosslinking can be optionally chosen. Also, if a surface active agent containing hydroxyl groups or acid amide compound is added, the period of heating and ageing can be greatly shortened, which is advantageous from the economical viewpoint.

DETAILED DESCRIPTION OF THE INVENTION

Figure 1:
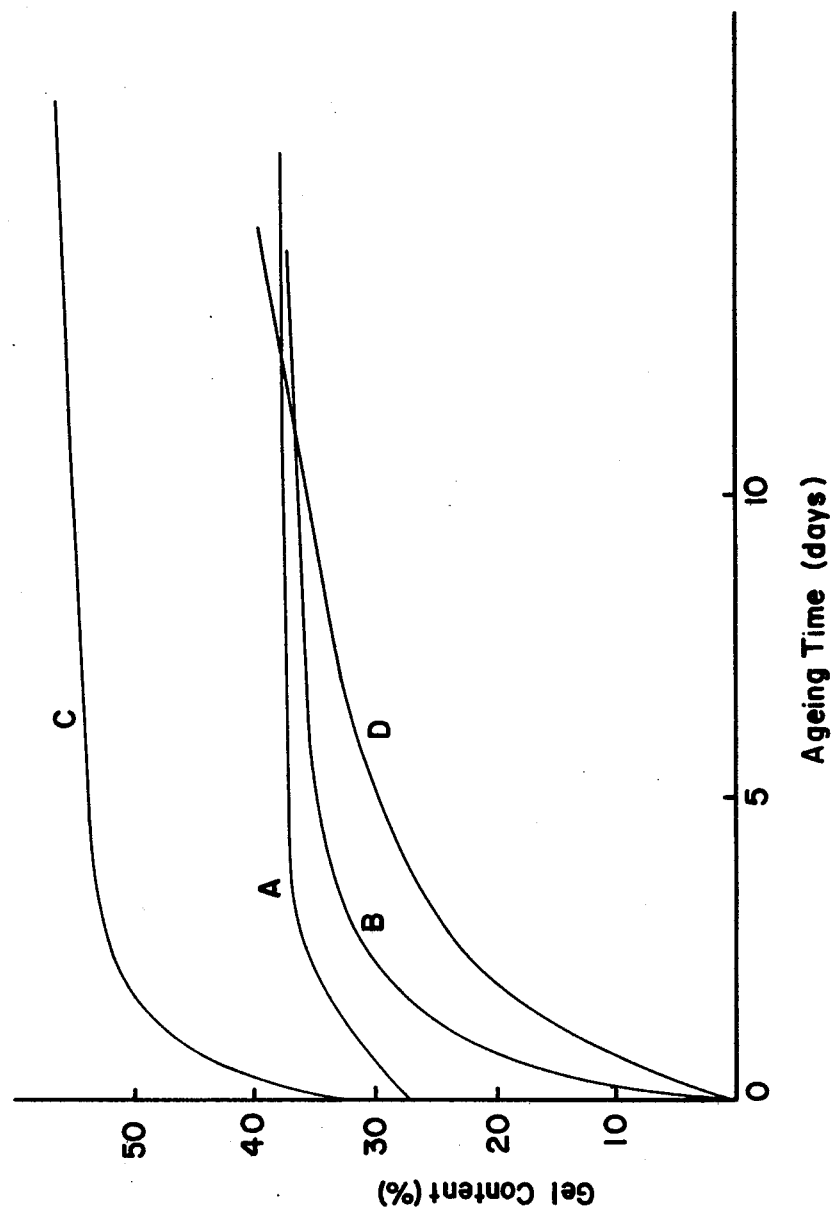
FIG. 1 is a graph showing the change of gel content of an expanded foam with a lapse of time for ageing.

According to the method of this invention, the silanol condensing catalyst for crosslinking is added after extrusion expansion, and consequently extrusion and expansion can be accomplished stably without undesirable side reactions. In other words, it is possible to suppress the premature crosslinking which is caused by an unavoidable entrance of water. In addition, according to the method of this invention, it is possible to minimize adverse effects, e.g., a decrease of crosslinking efficiency and premature crosslinking in the extruder, which are caused by some blowing agents, antistatic agents, and modifying resins containing hydroxyl groups that react with silyl groups.

The hydroxyl group-containing surface active agent or acid amide compound used in the method of this invention has the effects of preventing the foam from shrinking which otherwise occurs immediately after extrusion expansion, and of permitting the foam to recover its original dimensions quickly. This effect is pronounced in the case of flexible form such as highly expanded polyethylene, and in the case where a partial fatty ester of polyhydric alcohol or a fatty acid amide is used. In addition, the surface active agent or acid amide compound increases the affinity for water of the crosslinking catalyst which is brought into contact with the foam surface, and infiltrates the crosslinking catalyst into the resin matrix of the foam, increasing the crosslinking rate. Moreover, the surface active agent or acid amide compound provides an antistatic effect.

DESCRIPTION OF THE PREFERRED EMBODIMENTS

The polyethylene resin used for the method of this invention contains at least silylated ethylene polymer and a blowing agent, and, as required, a surface active agent containing hydroxyl groups or an acid amide compound. It may contain other adjuvant components such as a blowing auxiliary and nucleating agent.

The silylated ethylene polymer or "a crosslinkable ethylene polymer having on its side chains the silyl groups that effect crosslinking on contact with water" is a random copolymer of ethylene and an unsaturated silane compound or a graft copolymer of an ethylene polymer and an unsaturated silane compound.

In view of the characteristic properties of the copolymerization reaction and in view of the fact that the quantity of the unsaturated silane compound is much less than that of ethylene (in the random copolymer) or ethylene polymer (in the graft copolymer), it is not certain whether or not every polymer molecule in the copolymer has the silyl groups. Even though it is confirmed, it would be of no use. The silylated ethylene polymer used in the method of this invention should be understood as a polymer product which is obtained by random copolymerization or graft copolymerization in which an unsaturated silane compound is used as a comonomer.

A random copolymer is preferable because it has little smell, permits fusion bonding after crosslinking and is large in crosslinking efficiency and crosslinking rate.

The term "ethylene polymer" as used in this specification means an ethylene homopolymer, an ethylene copolymer, and a mixture thereof. The comonomer in the ethylene copolymer includes, for example, an α-olefin other than ethylene such as propylene, hexene-1, 4-methyl-pentene, vinyl acetate, (meth)acrylic acid and a salt thereof, (meth)acrylic ester, and vinyl chloride ("(meth)acrylic acid" denotes both acrylic acid and methacrylic acid).

The unsaturated silane compound to be introduced into the above-mentioned ethylene polymer is represented by the following formula.

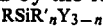

(where R is an ethylenic unsaturated hydrocarbyl or hydrocarbyloxy group; R' is an aliphatic saturated hydrocarbyl group; Y is a hydrolyzable organic group; n is 0, 1, or 2; and the groups represented by Y may be the same or different.)

In actual examples of the unsaturated silane compound, R is vinyl, allyl, propenyl, butenyl, cyclohexenyl, and γ-methacryloxypropyl; Y is methoxy, ethoxy, formyloxy, acetoxy, propionoxy, alkyl, and arylamino; and R' is methyl, ethyl, propyl, decyl, and phenyl.

Particularly preferred unsaturated silane compounds are represented by the following formula.

(where A is a hydrocarbyl group having 1 to 8 carbon atoms, preferably 1 to 4 carbon atoms.)

The most preferable compounds are vinyltrimethoxysilane, vinyltriethoxysilane, and vinyltriacetoxysilane.

The random copolymer and graft copolymer of ethylene (and comonomer as required) and an unsaturated silane compound as mentioned above may be prepared in any manner. For the production of the random copolymer, refer to Japanese Laid-open No. 9611/1980, and for the production of the graft copolymer, refer to Japanese Patent Publication No. 1711/1973.

The silylated ethylene copolymer, either random copolymer or graft copolymer, should contain the unsaturated silane compound unit in an amount of 0.01 to 15%, preferably 0.05 to 5%, more preferably 0.1 to 2% (by weight). The actual content of the unsaturated silane compound should be selected so that the "gel content" (defined later) is 5 to 95% in the final foam product.

The silylated ethylene polymer used in the method of this invention should have a melt flow rate (MFR) lower than 10 g/10 min, preferably 5 g/10 min.

The polyolefin resin containing a silylated ethylene polymer is a mixture of a silylated ethylene polymer and other ethylene polymers. "Other ethylene polymers" is defined the same way as for the above-mentioned "ethylene polymer"; it means ethylene homopolymer, ethylene copolymer, or a mixture thereof. The comonomer of the copolymer is the same as that mentioned above.

A typical example of "ethylene polymer" (which is also a typical example of the backbone polymer in the case where the silylated ethylene polymer is a graft copolymer) is low- to high-density polyethylene.

It is not always necessary that the polyolefin resin be composed of the above-mentioned ethylene polymer alone. Thus, the polyolefin resin may be a mixture of an ethylene polymer and a thermoplastic resin and rubber, such as polypropylene, polystyrene, polyvinyl chloride, polymethyl methacrylate, ethylenepropylene rubber, butyl rubber and styrene-butadiene rubber. The mixture should contain more than 50 wt. % of ethylene units.

The ethylene polymer should have an MFR lower than 10 g/10 min, preferably 5 g/10 min.

The blowing agent used in the method of this invention is a volatile blowing agent or a compressed gas. Examples of the former include propane, butane, pentane, methyl chloride, trichloromonofluoromethane, dichlorodifluoromethane, and 1,2-dichlorotetrafluoroethane; and examples of the latter include physical blowing agents such as carbon monoxide and nitrogen which are suitable for accomplishing the extent of foaming greater than 10 times. Further, the blowing agent of this invention includes a chemical decomposition-type blowing agent, e.g., azodicarbonamide, dinitrosopentamethylenetetramine, p,p'-oxybisbenzenesulfonyl hydrazine, and N,N'-dimethyl-N,N'-dinitrosoterephthalamide.

The hydroxyl group which is contained in the surface active agent of this invention is an alcoholic hydroxyl group. Accordingly, suitable examples of the surface active agent are partial esters of polyhydric alcohols and fatty acids. Examples of the polyhydric alcohols include ethylene glycol, propylene glycol, glycerin, pentaerythritol, sorbitan and the like. Examples of the fatty acids are saturated or unsaturated mono- or dicarboxylic acids having 10 to 20 carbon atoms with the monocarboxylic acids being preferred. Typical examples of the partial esters include monolaurin (lauric acid monoglycerol ester), dilaurin, a mixture of monolaurin and dilaurin, monopalmitin, dipalmitin, a mixture of monopalmitin and dipalmitin, monostearin, distearin, a mixture of monostearin and distearin, mono-olein, di-olein, a mixture of mono-olein and diolein, sorbitan mono-, di- and tripalmitate, sorbitan mono-, di- and tri-stearate and the like.

Other examples of the surface active agent are addition products of lower alkylene oxides (e.g., ethylene oxide and propylene oxide) to water, alcohols, carboxylic acids, amines or amides. Typical examples include ethylene oxide adducts to polyethylene glycol, monohydric alcohols having 10 to 20 carbon atoms, monocarboxylic acids or monocarboxylic acid amides or amines, such as poloxyethylene stearyl ether, polyethylene glycol monostearate, etc. Of these, the ethylene oxide adducts to water, alcohols and carboxylic acids are preferred.

In other words, those surface active agents which fall within the scope of non-ionic surface active agents are preferably used in this invention.

Examples of the acid amide compounds which can be used include primary, secondary and tertiary amides in which the hydrocarbon group which forms the acid is a saturated hydrocarbon group having 6 to 22 carbon atoms and the hydrocarbon group or groups which substitute the amide group or groups are a saturated hydrocarbon group having 1 to 22 carbon atoms. Typical examples include stearic acid amide, distearic acid amide, tristearic acid amide, lauric acid amide, dilauric acid amide, trilauric acid amide, N-methylstearic acid amide, N,N-dimethylstearic acid amide, N-ethylstearic acid amide, N,N'-diethylstearic acid amide, palmitic acid amide, myristic acid amide, oxystearic acid amide, etc., with the stearic acid amide, palmitic acid amide and lauric acid amide being preferred. The acid amide compound may be used along or in admixture.

The acid surface active agent or amide compound is used in an amount of 0.1 to 10 parts by weight, preferably 0.5 to 10 parts by weight, based on 100 parts by weight of the polyolefin resin including the silylated ethylene polymer.

The silanol condensing catalyst should preferably be used in the form of aqueous suspension or solution in a proper solvent, although a liquid catalyst may be used as such.

There are many compounds which have the function of silanol condensing catalyst. Any of them may be used in the method of this invention. The examples include carboxylates such as dibutyltin diacetate, dibutyltin dilaurate, dioctyltin dilaurate, stannous acetate, stannous caprylate, lead naphthenate, zinc caprylate, zinc stearate, titanium chelate and cobalt naphthenate, organometal compounds such as alkyl titanate and alkyl zirconate; organic bases such as butylamine, hexylamine and pyridine; organic acids such as acetic acid, oleic acid, phthalic acid and toluenesulfonic acid; and inorganic acid such as sulfuric acid and hydrochloric acid. Preferable among them are carboxylates. The actual quantity of the silanol condensing catalyst should be determined with reference to the examples mentioned later.

In addition to the above-mentioned components, the composition may contain other adjuvant components.

One of such adjuvant components is a blowing auxiliary which improves the foaming process or foam state when the expandable composition is mixed and extruded into a low-pressure zone where the extrudate is allowed to expand. It is generally known as a "nucleating agent". The typical examples include talc, fine calcium silicate, aluminum stearate, calcium carbonate, barium sulfate and a small quantity of decomposition-type inorganic or organic blowing agent (such as azodicarbonamide and sodium bicarbonate).

Other adjuvant components include pigments, slip agents, cell regulating agents, anti-static agents, antioxidants and inorganic fillers.

The above-mentioned composition is mixed under pressure and the resulting mixture is extruded into a low pressure zone, whereby an expanded extrudate (which is not substantially crosslinked) is obtained.

It is known to mix an expandable thermoplastic resin under pressure and heat and extrude the mixture into a low pressure zone. Thus the mixing and extrusion processes can be accomplished with any apparatus. It is satisfactory if the composition to be extruded becomes a uniform composition containing the above-mentioned components just before the extrusion die. Therefore, the blowing agent may be introduced into the extruder barrel or incorporated or impregnated into the ethylene polymer beforehand.

As the extrudate leaves the extrusion die and its relieved of pressure, it begins to expand immediately. The resulting foam has a cross-section similar to that of the die. The extrudate emerging from the extrusion die may be formed into a desired shape with a second die when the extrudate is expanding or is still in the molten state.

The expanded extrudate thus obtained may be transferred immediately to the subsequent cross-linking step where the expanded extrudate is treated or impregnated with a silanol condensing catalyst after the extrusion expansion. Otherwise, it is preferable to perform aging for the recovery of dimensions because a slight shrinkage may take place immediately after extrusion. Such aging may be performed at room temperature but aging with proper heating is preferable.

The extruded foam is substantially uncross-linked, except for a slight cross-linking which might have occurred due to a small quantity of water which inevitably exists in the composition.

The expanded extrudate obtained as above is brought into contact with a silanol condensing catalyst so that cross-linking is brought about by water. To put is concretely, the expanded extrudate is coated with or dipped in a solution or an aqueous dispersion of a silanol condensing catalyst. The coating method is preferable for the random copolymer.

The water may be pure water or water containing a water-soluble organic or inorganic compound. In addition, the water may be in the form of liquid or vapor. Moreover, moisture in the air brings about cross-linking. The cross-linking reaction is promoted by heating in the aging process.

The foam obtained by the method of this invention has an extent of foaming of 2 to 60 times, an average cell diameter greater than 0.3 mm and a gel content of 5 to 95%. These physical properties vary depending on the content of the ethylenic unsaturated silane compound, the type and quantity of the blowing agent, the MFR values of the polyolefin resin and the silylated ethylene polymer and other conditions.

These physical values are determined by the following methods:

1. Extent of Foaming

A reciprocal of the apparent density after expansion is determined in accordance with JIS-K6767.

2. Gel Content

A specimen is heated in toluene (100 ml for every 1 g of specimen) at the reflux temperature of toluene in a flask equipped with a Liebig reflux condenser. After heating for 10 hours, the content of the flask is filtered off with an 80-mesh stainless steel wire net. The resin which remains undissolved on the net is dried in vacuum and weighed. The ratio of the weight of the undissolved resin to the weight of the specimen is the gel content.

3. Average Cell Diameter

1. Test piece: A sample cut out of a foam specimen with a sharp edged tool.
2. Apparatus: A microscope of 10 to 100 magnifications with a graduated slide stage.
3. Method: Read the slide distance over which the foam test piece is moved until 20 cells are counted along a line drawn on the cut surface in parallel with the longitudinal or lateral or thickness direction.

4. Calculation:

$$D=(L/N)$$

D = Average cell diameter (mm/cell)
L = Slide Distance (mm)
N = Number of cells (20)

4. MFR: In accordance with JIS-K6770 (1971).

According to the method of this invention, the foam can be obtained in any form but, most typically, in the form of sheet.

The foam in the form of sheet can be used as heat insulation material, cushioning material and for other uses after secondary processing into proper shape. The foam sheet produced according to the method of this invention can undergo deep draw forming. Because it is good in heat resistance, it keeps good dimensional stability when it is heated, it prevents the cells from collapsing by melting, is good in thermoformability and keeps sufficient tensile strength and tensile elongation during thermoforming. These characterisitc properties are attributable to the combination of the silylated ethylene polymer that forms the cross-link backbond and the ethylene polymer as an optional component that constitutes the foam matrix.

The invention is described in detail with reference to the following non-limitative Examples and Comparative Examples, in which "parts" and "%" mean "parts by weight" and "wt%", respectively, unless otherwise indicated.

EXAMPLE 1

| | |
|---|---|
| Silylated ethylene polymer [containing 1.2% of silane unit; vinyl-trimethoxysilane-grafted low-density polyethylene (a product of Mitsubishi Petrochemical Co., Ltd.) having MFR 0.30 and a density 0.922] | 30 parts |
| Ethylene polymer [low density polyethylene (HE-30, a product of Mitsubishi Petrochemical Co., Ltd.) having MFR 0.30 and density 0.92] | 70 parts |
| Talc (as a nucleating agent) | 1.0 part |

A composition of the above formulation was extruded from an extruder (cylinder diameter 90 mm and L/D 35). Butane as a blowing agent was introduced into the extruder cylinder at a rate of 16 parts.

The extruder was connected to an annular die having a 0.7 mm annular slit, about 100 mm in diameter. The mixed melt was extruded through this die and allowed to expand in the atmosphere. The resulting tubular foam was cut along the longitudinal direction to obtain a foam in the sheet form.

Immediately after the extrusion, the foam sheet was dipped in 10 wt% ethanol solution of dibutyltin dilaurate as a condensing catalyst for one minute, followed by air drying at 80° C. for several minutes. The gel content was 0% just before the dipping and about 25% after the air drying. Subsequently, the foam sheet was heat aged and exposed to air at 60° C. and 50% RH to effect cross-linking.

Three days after the treatment, the foam sheet was 3.1 mm thick and 1050 mm wide and had an extent of foaming of 43 times and an average cell diameter of 0.63 mm. The treated foam sheet had a gel content of:

32%—2 days later; 34%—3 days later and 36%—6 days later, respectively, and the foam substantially completely recovered in dimensions 3 days after the aging.

EXAMPLE 2

| | |
|---|---|
| Silylated ethylene polymer | 40 parts |
| [containing 0.9% of silane unit; random copolymer of vinyltrimethoxysilane and ethylene (X-176, a product of Mitsubishi Petrochemical Co., Ltd.) having MFR 1.20 and density 0.922] | |
| Ethylene polymer | 60 parts |
| [low density polyethylene (HE-30, a product of Mitsubishi Petrochemical Co., Ltd.) having MFR 0.30 and density 0.92] | |
| Talc (as a nucleating agent) | 1.0 part |

A composition of the above formulation was extruded from an extruder (cylinder diameter 90 mm and L/D 35). Butane as a blowing agent was introduced into the extruder cylinder at a rate of 16 parts.

An annular die having a 0.6 mm annular slit about 60 mm in diameter was used.

A foam obtained in the form of sheet as in Example 1 was roll-coated with 10 wt% ethanol solution of dibutyltin dilaurate, followed by air drying at 80° C. for several minutes. The gel content was 0% just before the coating of catalyst and about 40% after the air drying. Subsequently, the foam sheet was exposed to air at 60° C. and 50% RH to effect cross-linking.

Three days after the treatment, the foam sheet was 2.7 mm thick and 640 mm wide and had an extent of foaming of 40 times and an average cell diameter of 0.69 mm. The treated foam sheet had a gel content of: 60%—2 days later, 63%—3 days later and 66%—6 days later, respectively, and the foam substantially completely recovered in dimensions 3 days after the aging.

EXAMPLE 3

| | |
|---|---|
| Silylated ethylene polymer | 30 parts |
| [containing 1.2% of silane unit; vinyltrimethoxysilane-grafted low-density polyethylene (a product of Mitsubishi Petrochemical Co., Ltd ) having MFR 0.30 and density 0.922] | |
| Ethylene polymer | 70 parts |
| [low-density polyethylene (HE-30, a product of Mitsubishi Petrochemical Co., Ltd.) having MFR 0.30 and density 0.92] | |
| Talc (as a nucleating agent) | 1.0 part |

A composition of the above formulation was extruded from an extruder (cylinder diameter 90 mm and L/D 35). Butane as a blowing agent and stearic acid monoglyceride (TS-5, a product of Kao Soap Co., Ltd. which contains at least 90% of stearic acid monoglyceride) as a surface active agent containing hydroxyl groups were introduced into the extruder cylinder at a rate of 16 parts and 1.8 parts, respectively.

The extruder was connected to an annular die having a 0.7 mm annular slit about 100 mm in diameter and the mixed melt was extruded through this die and allowed to expand in the atmosphere. The resulting tubular foam was cut along the longitudinal direction to obtain a foam in the sheet form.

This foam was allowed to stand at about 20° C. and 60% RH for about 12 hours. Then the foam was roll-coated with a catalyst solution of dibutyltin dilaurate (20%) and toluene (80%) and passed through an air-drying oven at 80° C. and 50% RH with a dwell time of 7 seconds. The foam sheet was then aged and cross-linked at 60° C. and 50% RH.

One day after the treatment, the foam sheet was 3 mm thick and 1080 mm wide and had an extent of foaming of 45 times, and an average cell diameter of 0.65 mm.

The gel content immediately after application and drying of catalyst was 27% and it increased to 32% one day later, 35% 2 days later, 36% 3 days later and 37% 6 days later, respectively, by heating at 60° C. and 50% RH. These gel contents are plotted as curve "A" in FIG. 1.

The foam just before the application of catalyst was not in a strong shrinking state and it substantially completely recovered in dimension one day after the aging.

The foam sheet thus obtained was measured for static charge by applying a voltage of 8 kV (detector height 20 mm) with a Static Wolastometer (made by Shishido Shokai K. K.). The static charge voltage was 28 mV (average of front and back sides) and damping after 30 seconds was 55% (average). Thus it was confirmed that the foam sheet in this Example is effective to prevent static charge.

COMPARATIVE EXAMPLE 1

| | |
|---|---|
| Silylated ethylene polymer | 30 parts |
| [containing 1.2% of silane unit; vinyltrimethoxysilane-grafted low-density polyethylene (a product of Mitsubishi Petrochemical Co., Ltd.) having MFR 0.30 and density 0.922] | |
| Ethylene polymer | 70 parts |
| [low-density polyethylene (HE-30, a product of Mitsubishi Petrochemical Co., Ltd.) having MFR 0.30 and density 0.92] | |
| Low-density polyethylene (HE-30) master batch | 5.05 parts |
| [containing 1% of dibutyltin dilaurate as a silanol-condensing catalyst] | |
| Talc (as a nucleating agent) | 1.0 part |

A composition of the above formulation was extruded from the same extruder as used in Example 3 and butane as a blowing agent was introduced into the extruder cylinder at a rate of 16 parts.

The resulting foam expanded and molded as in Example 3 was in the extremely shrunken form. For recovery of the dimensions and promotion of cross-linking reaction, the foam was aged in an oven at 60° C. and 50% RH. It took 3 to 4 days for the foam to reach complete recovery. The gel content was 0% immediately after extrusion expansion and it increased to 24% one day, 27% in two days, and 32% in 3 days after the aging, respectively. These gel contents are plotted as curve "B" in FIG. 1. It took 5 to 6 days until the gel content reached 35%.

In other words, the foam sheet in this comparative example is slower in cross-linking as compared with that in Example 3. In actual production, slow cross-linkin leads to a long aging period and a low cross-linking efficiency.

Six days after aging, the foam sheet was 3 mm thick and 1050 mm wide and had an extent of foaming of 42 times, and an average cell diameter of 0.6 mm.

In the static charge test as in Example 3, the static charge voltage was 28 mV and damping after 30 seconds was only 4.5%. This indicates that the foam sheet in this Comparative Example is easy to become charged.

EXAMPLE 4

A foam in the form of sheet was prepared in the same way as in Example 3 except that the vinyltrimethoxysilane-ethylene random copolymer as used in Example 2 was used as the silylated ethylene polymer.

One day after the treatment, the resulting foam was 3 mm thick and 1070 mm wide and had an extent of foaming of 45 times and an average cell diameter of 0.65 mm.

The gel content immediately after application and drying of catalyst was 32% and it increased to 47% one day, 51% 2 days, 53% 3 days and 54% 6 days, after aging at 60° C. and 50% RH. These gel contents are plotted as curve "C" in FIG. 1.

The foam just before the application of catalyst was not in a strong shrinking state and it substantially completely recovered in dimension one day after the aging.

COMPARATIVE EXAMPLE 2

| | |
|---|---|
| Silylated ethylene polymer | 30 parts |
| [containing 0.9% of silane unit; vinyl-trimethoxysilane-ethylene random copolymer (a product of Mitsubishi Petrochemical Co Ltd.) having MFR 1.20 and density 0.922] | |
| Ethylene polymer | 70 parts |
| [low-density polyethylene (HE-30 a product of Mitsubishi Petrochemical Co., Ltd.) having MFR 0.30 and density 0.92] | |
| Low-density polyethylene (HE-30) master batch | 5.05 parts |
| [containing 1% of dibutyltin dilaurate as a silanol-condensing catalyst] | |
| Talc (as a nucleating agent) | 1.0 part |

A composition of the above formulation was extruded from the same extruder as used in Example 3 and butane as a blowing agent was introduced into the extruder cylinder at a rate of 16 parts.

The resulting foam expanded and molded as in Example 3 was in the extremely shrunken form. For recovery of dimensions and promotion of cross-linking reaction, the foam was aged in an oven at 60° C. and 50% RH. It took 3 to 4 days for the foam to recover completely. The gel content was 0% immediately after extrusion expansion and it increased to 14% after 1 day, 20% after 2 days, 25% after 3 days, 33% after 6 days and 40% after 16 days. Cross-linking was still going on after 16 days of aging. These gel contents are plotted as curve "D" in FIG. 1.

In other words, the foam sheet in this comparative example is much slower in cross-linking reaction and much lower in degree of cross-linking as compared with that in Example 4.

On the other hand, in the above method, 1.0 part of stearic acid monoglyceride was supplied into the middle portion of the extruder to effect the extrusion and expansion. However, the expansion was so insufficient that the expanded foam cannot be drawn out in a good sheet state. Further, the cells were collapsed and they did not swell even after the aging by heat. Thus the resulting sheet did not reach even an extent of foaming of 10 times. The gel content immediately after the extrusion was even 20% and it was confirmed that the cross-linking did not proceed.

EXAMPLE 5

| | |
|---|---|
| Silylated ethylene polymer | 30 parts |
| [containing 1.2% of silane unit; vinyl-trimethoxysilane-grafted low-density polyethylene (a product of Mitsubishi Petrochemical Co. Ltd) having MFR 0.30 and density 0.922] | |
| Ethylene polymer | 70 parts |
| [low-density polyethylene (HE-30), a product of Mitsubishi Petrochemical Co., Ltd.) having MFR 0.30 and density | |
| Talc (as a nucleating agent) | 1.0 part |

A composition of the above formulation was extruded from an extruder (cylinder diameter 65 mm and L/D 35). Butane as a blowing agent and polyoxyethylene monostearate $R_1-O-(CH_2-CH_2-O)_n-H$ (wherein n=2) (Nikkol MYS-2, a product of Nikko Chemical Co., LTd.) as a surface active agent containing hydroxyl groups were introduced into the extruder cylinder at a rate of 13 parts and 2.8 parts, respectively.

The extruder was connected to an annular die having a 0.7 mm annular slit about 60 mm in diameter and the mixed melt was extruded through this die and allowed to expand in the atmosphere. The resulting tubular foam was cut along the longitudinal direction to obtain a foam in the sheet form.

This foam was allowed to stand at about 20° C. and 60% RH for about 12 hours. Then the foam was coated with 10% ethanol solution of dioctyltin dilaurate in the same manner as in Example 3. The foam was dried and aged at 60° C. and 50% RH. The foam sheet was slightly shrunk before the aging but it substantially recovered in dimension one day after the aging.

The foam sheet, one day after the treatment, was 2.8 mm thick and 640 mm wide and had an extent of foaming of 32 times, and an average cell diameter of 0.62 mm.

The gel content immediately after application and drying of catalyst was 23% and it increased to 34% after aging for 3 days.

The foam sheet thus obtained was measured for static charge as in Example 3. The static charge voltage was 8 mV and damping after 30 seconds was 80%. Thus it was confirmed that the foam sheet in this Example is highly effective to prevent static charge.

EXAMPLE 6

A mixture of 100 parts of the same silylated ethylene polymer as in Example 1 and 1 part of, as a nucleating agent, talc was extruded from an extruder having cylinder diameter 65 mm and L/D 35 and a die having a 0.4 mm annular slit, 60 mm in diameter, 14 parts of, as a blowing agent, butane and 1.5 parts of an acid amide (AP-1, a product of Nippon Kasei Chemical Co., Ltd., which is obtained by ammonolysis of purified, highly hydrogenated beef tallow and contains therein saturated hydrocarbons having 18 and 16 carbon atoms) were supplied into the middle portion of the extruder to effect extrusion and expansion.

Figure 2:
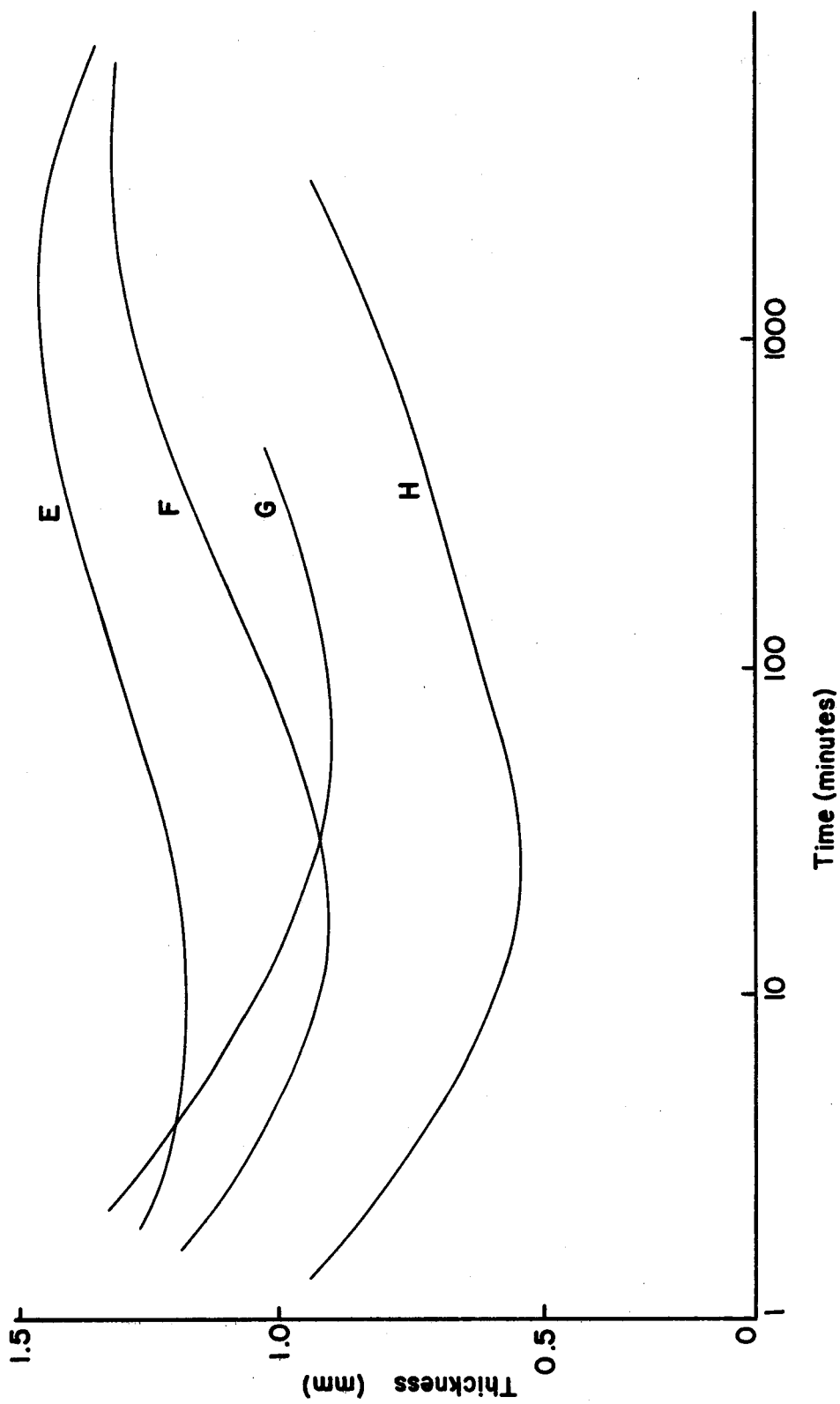
FIG. 2 is a semi-logarithmic graph showing the change of the thicknesses of foamed sheets with time after extrusion expansion.

The behavior of the foam immediately after the extrusion is shown as curve "G" in FIG. 2. It is clear from FIG. 2 that this foam exhibited an effect for preventing the shrinking.

The foam was allowed to stand at room temperature for 12 hours and, in the same manner as in Example 5, the catalyst was applied followed by aging by heat.

The gel content of the resulting foam was 0% immediately after the application. It increased to 71% one day and 77% 3 days after the aging, whereby it reached substantially a constant value. Thus it was confirmed that the aging was completed. The aging time of the foam obtained in this Example was shortened to 6 to 7 days as compared with a foam obtained by using no acid amide and adding the catalyst at the first stage.

The foam thus obtained was 1.3 mm thick and 620 mm wide and had an extent of foaming of 34 times.

TEST EXAMPLE

The foam sheet samples prepared in Example 3, Example 5, Example 6 and Comparative Example 1 (with an extruder having cylinder diameter 65 mm and L/D 35 and a die having a 0.4 mm annular slit, 60 mm in diameter) were measured for the change of thickness with time after standing at about 25° C. The thickness was measured with a dial gauge. The results are plotted in a semi-logarithmic graph as shown in FIG. 2. Curves E, F, G and H represent samples obtained in Example 3, Example 5, Example 6 and Comparative Example 1, respectively.

The thickness of the sheet immediately after emergence of the die is not plotted in the graph because measurement is impossible to carry out. However, it is considered that the three samples are almost the same.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims rather than the foregoing description and all changes which come within the meaning and range of equivalency of the claims are, therefore, to be embraced therein.

What is claimed:

1. A method for producing crosslinked polyethylene which consists essentially of:
   mixing a polyolefin resin and a blowing agent under pressure, the polyolefin containing a crosslinkable ethylene polymer having silyl groups on the side chains thereof, the silyl groups effecting crosslinking on contact with water;
   extruding the mixture into a low pressure zone, whereby the extrudate is expanded; and thereafter
   contacting the expanded extrudate with a silanol condensing catalyst, and crosslinking the expanded extrudate by contacting with water.

2. A method for producing crosslinked polyethylene foams as claimed in claim 1 wherein the crosslinkable ethylene polymer having the silyl groups on the side chains thereof is a random copolymer of ethylene and an unsaturated silane compound or a graft copolymer of ethylene and an unsaturated silane compound.

3. A method for producing crosslinked polyethylene foams as claimed in claim 1 wherein the polyolefin resin is a mixture of silylated ethylene polymer and other ethylene polymer.

4. A method for producing crosslinked polyethylene foams as claimed in claim 3 wherein the ethylene polymer is ethylene homopolymer, ethylene copolymer composed mainly of ethylene and a mixture thereof.

5. A method for producing crosslinked polyethylene resin foams which consists essentially of:
   mixing a polyolefin resin, a blowing agent and a surface active agent containing hydroxyl groups under pressure, the polyolefin resin containing a crosslinkable ethylene polymer having silyl group on the side chains thereof, the silyl groups effecting crosslinking on contact with water;
   extruding the mixture into a low pressure zone, whereby the extrudate is expanded; and thereafter
   contacting the expanded extrudate with a silanol condensing catalyst, and crosslinking the expanded extrudate by contacting with water.

6. A method for producing crosslinked polyethylene foams as claimed in claim 5 wherein the crosslinkable ethylene polymer having the silyl groups on the side chains thereof is a random copolymer of ethylene and an unsaturated silane compound or a graft copolymer of ethylene and an unsaturated silane compound.

7. A method for producing crosslinked polyethylene foams as claimed in claim 5 or 6 wherein the polyolefin resin is a mixture of silylated ethylene polymer and other ethylene polymer.

8. A method for producing crosslinked polyethylene foams as claimed in claim 7 wherein the ethylene polymer is ethylene homopolymer, ethylene copolymer composed mainly of ethylene and a mixture thereof.

9. A method for producing crosslinked polyethylene foams as claimed in claim 5 wherein the surface active agent containing hydroxyl groups is selected from the group consisting of fatty acid monoglycerin ester, fatty acid polyglycol ester, fatty acid sorbitan ester and fatty acid alkanolamide.

10. A method for producing crosslinked polyethylene foams as claimed in any one of claims 5 to 9 wherein the surface active agent containing hydroxyl groups is used in an amount of 0.1 to 10 wt% based on the polyolefin resin.

11. A method for producing crosslinked polyethylene resin foams which consists essentially of:
    mixing a polyolefin resin, a blowing agent and an acid amide compound under pressure, the polyolefin resin containing a crosslinkable ethylene polymer having silyl groups on the side chains thereof, the silyl groups effecting crosslinking on contact with water;
    extruding the mixture into a low pressure zone, whereby the extrudate is expanded; and thereafter
    contacting the expanded extrudate with a silanol condensing catalyst, and crosslinking the expanded extrudate by contacting with water.

12. A method for producing crosslinked polyethylene foams as claimed in claim 11 wherein the crosslinkable ethylene polymer having the silyl groups on the side chains thereof is a random copolymer of ethylene and an unsaturated silane compound of a graft copolymer or ethylene and an unsaturated silane compound.

13. A method for producing crosslinked polyethylene foams as claimed in claim 11 or 12 wherein the polyolefin resin polymer.

14. A method for producing crosslinked polyethylene foams as claimed in claim 13 wherein the ethylene polymer is ethylene homopolymer, ethylene copolymer composed mainly of ethylene and a mixture thereof.

15. A method for producing crosslinked polyethylene foams as claimed in claim 11 wherein the acid amide compound is selected from the group consisting of primary, secondary and tertiary amides, in which a saturated hydrocarbon group of 6 to 22 carbon atoms forms the acid.

16. A method for producing crosslinked polyethylene foams as claimed in claim 15 wherein the amide group or groups of the acid amide compound are substituted by a saturated hydrocarbon group having 1 to 22 carbon atoms.

17. A method for producing crosslinked polyethylene foams as claimed in any one of claim 11 to 16 wherein the acid amide compound is used in an amount of 0.1 to 10 wt% based on the polyolefin resin.

18. A method for producing crosslinked polyethylene foams, as claimed in any one of claims 1, 5 or 11, wherein the blowing agent is a volatile blowing agent.